US012331994B2

(12) United States Patent
Böhm

(10) Patent No.: US 12,331,994 B2
(45) Date of Patent: Jun. 17, 2025

(54) VIBRATING ROUND DEVICE

(71) Applicant: Rösler Holding GmbH, Bad Staffelstein (DE)

(72) Inventor: Rüdiger Böhm, Untermerzbach (DE)

(73) Assignee: Rösler Holding GmbH, Bad Staffelstein (DE)

( * ) Notice: Subject to any disclaimer, the term of this patent is extended or adjusted under 35 U.S.C. 154(b) by 0 days.

(21) Appl. No.: 17/626,759

(22) PCT Filed: Jul. 2, 2020

(86) PCT No.: PCT/EP2020/068640

§ 371 (c)(1),
(2) Date: Jan. 12, 2022

(87) PCT Pub. No.: WO2021/008883

PCT Pub. Date: Jan. 21, 2021

(65) Prior Publication Data

US 2022/0299265 A1 Sep. 22, 2022

(30) Foreign Application Priority Data

Jul. 12, 2019 (DE) ......................... 102019118899.7

(51) Int. Cl.
*F26B 15/26* (2006.01)
*F26B 3/22* (2006.01)
*F26B 5/16* (2006.01)

(52) U.S. Cl.
CPC ................ *F26B 15/26* (2013.01); *F26B 3/22* (2013.01); *F26B 5/16* (2013.01)

(58) Field of Classification Search
CPC ... F26B 15/26; F26B 3/22; F26B 5/16; H05B 3/48
USPC ............................................ 34/484; 219/544
See application file for complete search history.

(56) References Cited

U.S. PATENT DOCUMENTS 4,258,507 A 3/1981 Majors et al.
4,480,175 A * 10/1984 Brasky .................. H05B 3/283 392/435
4,746,968 A 5/1988 Wear et al.
6,233,842 B1 * 5/2001 Geelen .................. F26B 17/002 34/484
6,294,769 B1 * 9/2001 McCarter ................. H05B 3/42 219/544
2005/0016986 A1 * 1/2005 Ito ....................... C04B 35/6303 219/468.1

(Continued)

FOREIGN PATENT DOCUMENTS

CN 2196767 Y 5/1995
CN 101543976 A 9/2009
CN 202083193 U 12/2011

(Continued)

OTHER PUBLICATIONS

Translation, KR-20140145752-A (Year: 2014).*

(Continued)

*Primary Examiner* — Jessica Yuen
(74) *Attorney, Agent, or Firm* — Dickinson Wright PLLC

(57) ABSTRACT

A vibratory round dryer comprises a container that is resiliently supported; and a working passage. A heating device, which is installed at the container, is provided for heating the drying agent and workpieces.

17 Claims, 3 Drawing Sheets

(56) References Cited

U.S. PATENT DOCUMENTS

2018/0168203 A1 6/2018 Wicherski

FOREIGN PATENT DOCUMENTS

Figure 1:
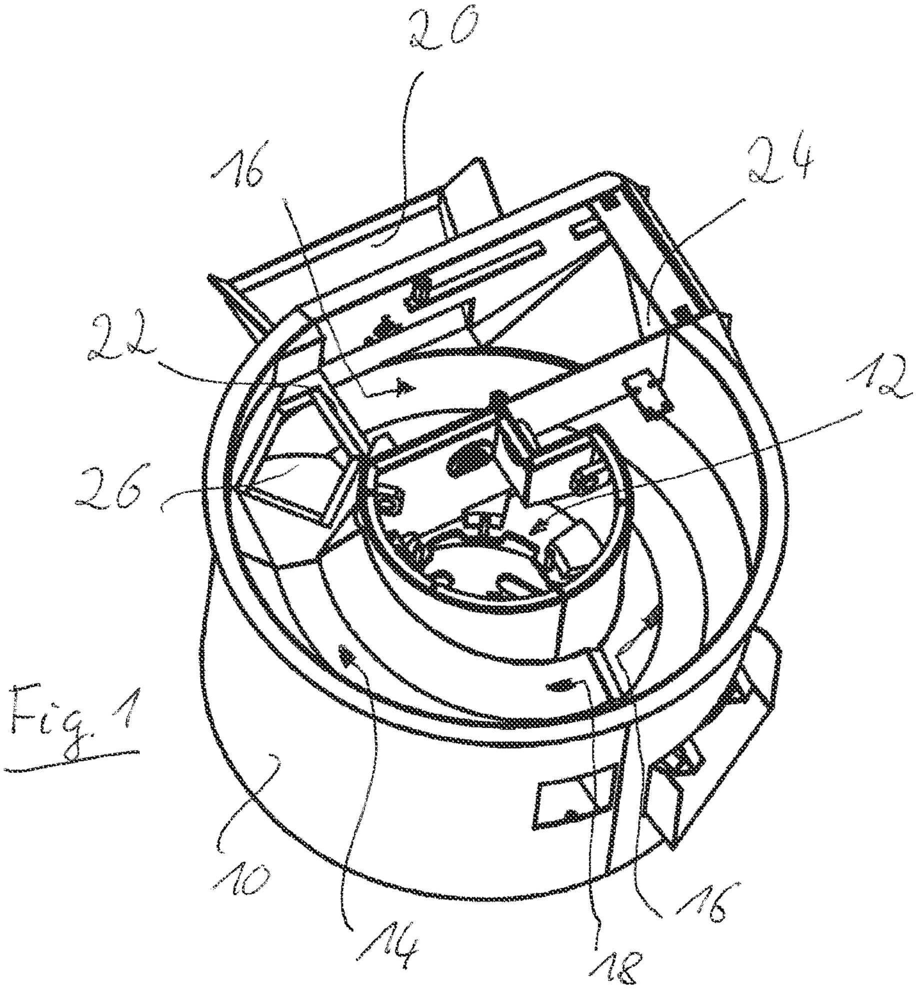

| | | | | |
|---|---|---|---|---|
| CN | 202095117 | U | * | 12/2011 |
| CN | 205053826 | U | * | 3/2016 |
| CN | 103659560 | B | | 9/2016 |
| CN | 206831966 | U | | 1/2018 |
| CN | 208059306 | U | * | 11/2018 |
| DE | 10065841 | A1 | | 7/2002 |
| EP | 0400516 | A1 | | 12/1990 |
| EP | 1491130 | A2 | | 12/2004 |
| EP | 1523931 | A1 | | 4/2005 |
| EP | 3033985 | A1 | | 6/2016 |
| GB | 1447735 | A | | 8/1976 |
| JP | H0358851 | A | * | 3/1991 |
| JP | H0818922 | B2 | * | 11/1992 |
| JP | H0875362 | A | | 3/1996 |
| JP | 2889672 | B2 | * | 5/1999 |
| KR | 20140145752 | A | * | 12/2014 |
| TW | M452847 | U | * | 5/2013 |

OTHER PUBLICATIONS

Translation, CN-208059306-U (Year: 2018).*
Translation, JP-2889672-B2 (Year: 1999).*
Translation, JP-H0358851-A (Year: 1991).*
Translation, JP-H0818922-B2 (Year: 1992).*
Translation CN-205053826-U (Year: 2016).*
Translation CN-202095117-U (Year: 2011).*
Translation, TW-M452847-U (Year: 2013).*
German Search Report mailed Apr. 20, 2020 for German Application No. 102019118899.7, 6 pages.
International Search Report and Written Opinion mailed Dec. 3, 2020 for International Application No. PCT/EP2020/068640, 26 pages.

* cited by examiner

VIBRATING ROUND DEVICE

CROSS-REFERENCES TO RELATED APPLICATIONS

This application is a 371 National Phase Application of Patent Application PCT/EP2020/068640, filed on Jul. 2, 2020, which claims the priority of German Patent Application 102019118899.7, filed on Jul. 12, 2019, each of which is incorporated herein by reference, in their entirety.

The disclosure relates to a vibrating round dryer including a container that is resiliently supported on a base frame and that can be set into vibration by an oscillation unit. The vibrating round dryer also includes a working passage provided in the container. The vibrating round dryer further includes a heating device for heating drying agent and workpieces that are located in the working passage.

Such vibrating round dryers are generally known and serve to dry, circulate, and lightly polish workpieces, primarily metals of all kinds, in the working passage through the machine movement. The drying agent absorbs moisture/residual dirt brought in and ensures that the workpiece surfaces are free of stains. This can be controlled in a time-controlled manner within e.g. 1.5-3 minutes, in a single run, or batch-wise. While the workpieces move in loose bulk in the working passage of the dryer, the drying agent represents an embedding thereof and thus prevents a direct workpiece contact that could lead to contact/damage in the case of sensitive workpieces. The absorption of liquid residues and of contamination is ensured until the drying agent or drying medium, for example corncob meal, natural kernel meal or the like, is soaked, moist, and increasingly contaminated. Heat is therefore used to keep the medium constantly ready for use, wherein an energy-saving plant technology is becoming increasingly important, in particular when machines work almost all day without interruption, as is often the case with workpiece drying plants.

The embodiments disclosed herein provide a vibrating round dryer which has an energy-efficient operation with an inexpensive manufacture, wherein the risk of damage to the drying agent is simultaneously to be prevented and a disturbance-free operation is to be ensured.

The heating device disclosed herein is thermally conductively installed at the container.

In contrast to known solutions, in which, for example, a heating coil is fastened to the non-vibrating base frame or is fastened in a free-standing manner in order to transfer heat to the drying agent by means of convection, the heating of the drying agent or of the workpieces takes place by heat conductance in accordance with the invention. It has namely surprisingly been found that, in contrast conventional ideas, a fastening of the heating device to the vibrating container enables a disturbance-free operation, wherein a substantially more efficient transfer of the heat to the drying agent located in the working passage can take place at the same time. In contrast to heating fans also used in the prior art or heating coils which are flowed through by the drying agent, in the solution in accordance with the invention neither a dust-raising air flow is produced nor is there any danger of the drying agent, workpieces, or fragments becoming jammed, sticking, or toasted, or catching fire.

The solution in accordance with the invention can be implemented at a very low cost and enables a very precise control of the thermal energy introduced into the drying agent.

Advantageous embodiments are described in the description, in the drawing, and in the dependent claims.

In accordance with a first advantageous embodiment, the heating device can be installed at the lower side of the working passage. A particularly efficient heat transfer to the working passage and thus to the drying agent hereby results, wherein the heat transfer takes place by thermal conduction and not by convection or radiation. In a design aspect, a simple solution can be provided if the heating device is installed at the lower side of a planar base plate of the working passage. Alternatively or additionally, the heating device could also be installed at a side wall of the working passage.

In accordance with a further advantageous embodiment, the working passage can have a planar section and a helically rising section, wherein the heating device is only provided in the region of the planar section of the working passage. This facilitates the manufacture of the heating device since it can also be formed with its installation surface planar in this case. Alternatively or additionally, the heating device could, however, also be installed at the helically rising section of the working passage.

In accordance with a further advantageous embodiment, the heating device can have at least one thermally conductive block in which at least one heating rod is embedded. In this embodiment, a robust solution is provided, on the one hand, which can be operated at the vibrating container without any disturbances in operation. It is simultaneously ensured by the thermally conductive block that the heat from the heating rod is transferred over a large area to the container or to the base of the working passage. Finally, it is ensured by the embedding of the heating rod in the thermally conductive block that contamination, foreign parts, and dust cannot move onto the heating rod, which ensures a disturbance-free operation over a long period of time.

In accordance with a further advantageous embodiment, a temperature sensor can be embedded in the thermally conductive block to monitor the temperature in the region of the heating rod and to ensure that it is in operation and not overheating.

In accordance with a further advantageous embodiment, the thermally conductive block can have a recess which passes through it and in which a bearing part of the container is arranged. In this embodiment, the thermally conductive block can thus also be installed in regions in which a large-area application of the thermally conductive block would otherwise not be possible. Due to the provision of the recess, the thermally conductive block can, however, be fastened in regions that are otherwise provided for bearing parts of the container, for example, for storing springs of the container.

In accordance with a further advantageous embodiment, the heating device can be thermally conductively connected to the container over an area of at least 150 $cm^2$, in particular of at least 300 $cm^2$, and in particular of at least 500 $cm^2$. A very good heat transfer can be achieved by such large thermally conductive transfer surfaces.

In accordance with a further advantageous embodiment, at least one temperature sensor can be provided in the base of the working passage to optimize the process control. Due to such a direct measurement, the temperature of the drying agent can be directly and accurately detected so that the heating device can be controlled or regulated with a high efficiency and also in a fast-responding manner.

In accordance with a further advantageous embodiment, the heating device can comprise a plurality of heating modules that are controlled and monitored independently of one another, in particular by a control. Not only a very precise and graduated transfer of heat to the drying agent can be achieved with this embodiment. Rather, due to the independent control and monitoring, an operation of the system can also be continued if one of the heating modules should fail.

In accordance with a further advantageous embodiment, the container can be provided with a thermal insulation in the region of the working passage. On the one hand, the energy efficiency can hereby be increased. On the other hand, it can also be ensured by such a thermal insulation that an operator does not accidentally burn himself at machine parts.

It may further be advantageous if the working passage is provided with a cover at its upper side since the heat loss can hereby also be reduced.

If the container is at least partly provided with a thermally insulating wear protection layer in the region of the working passage, for example with a coating composed of a ceramic material or polytetrafluoroethylene, an increased service life can also be achieved in addition to the thermal insulation.

Figure 2:
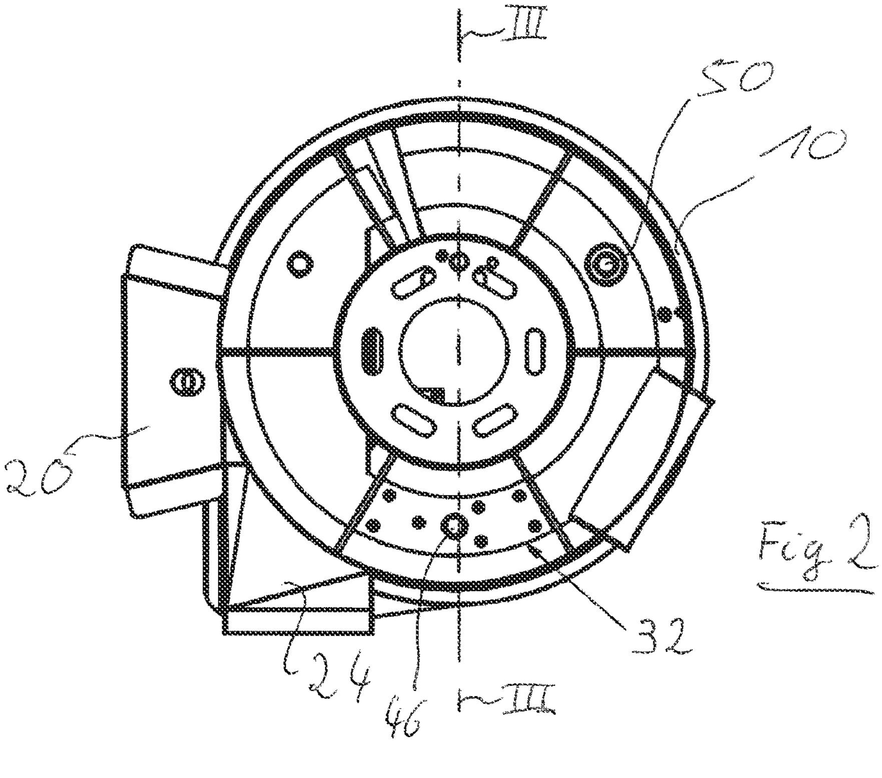
Figure 3:
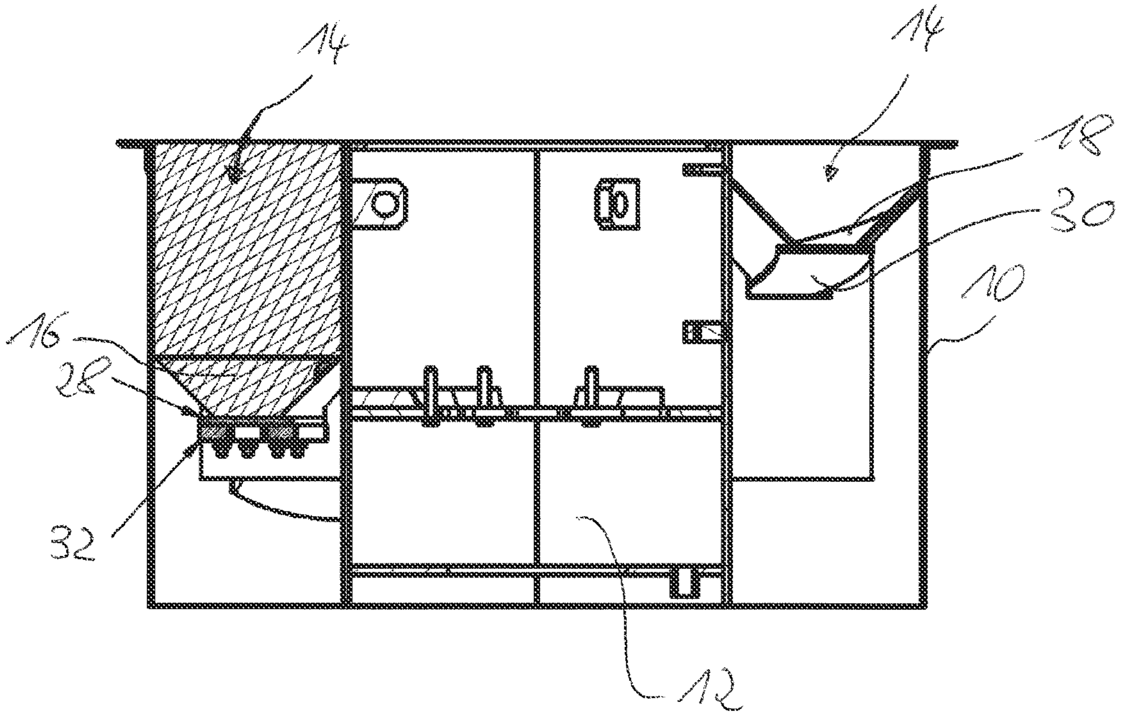
Figure 4:
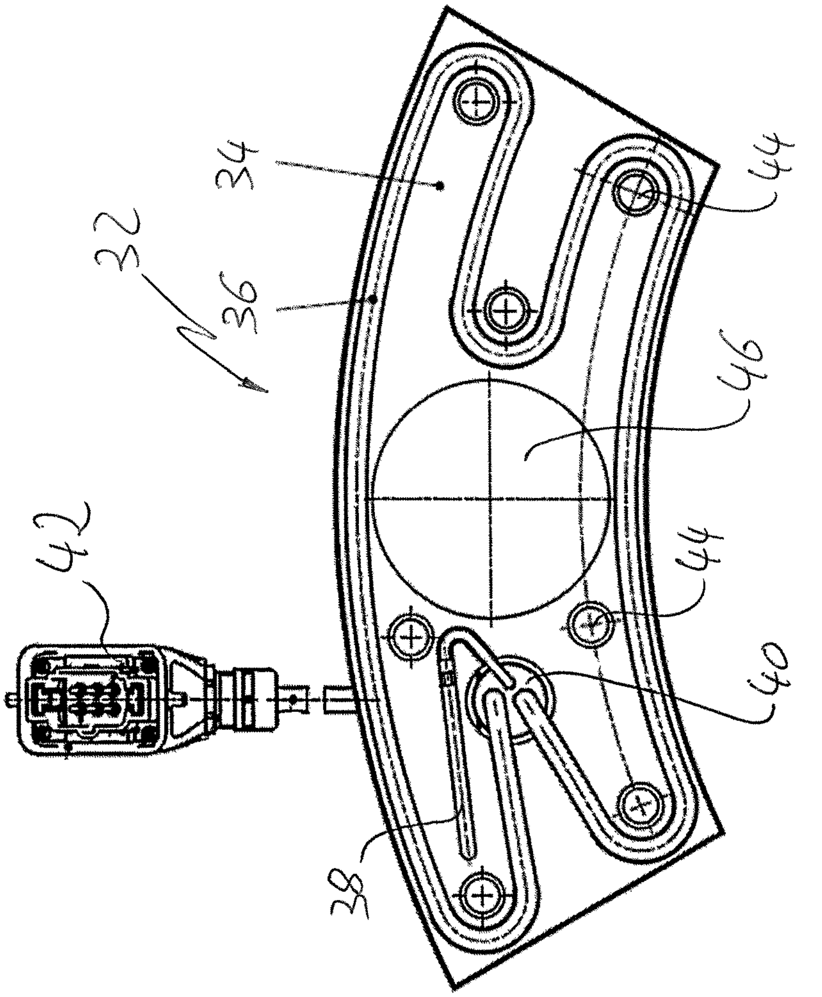

The present invention will be described in the following purely by way of example with reference to an advantageous embodiment and to the enclosed drawings. There are shown:

FIG. 1 a perspective plan view of a vibrating round dryer;

FIG. 2 a view from below of the vibrating round dryer of FIG. 1;

FIG. 3 a section along the line III-III of FIG. 2;

FIG. 4 a plan view of a heating device; and

Figure 5:
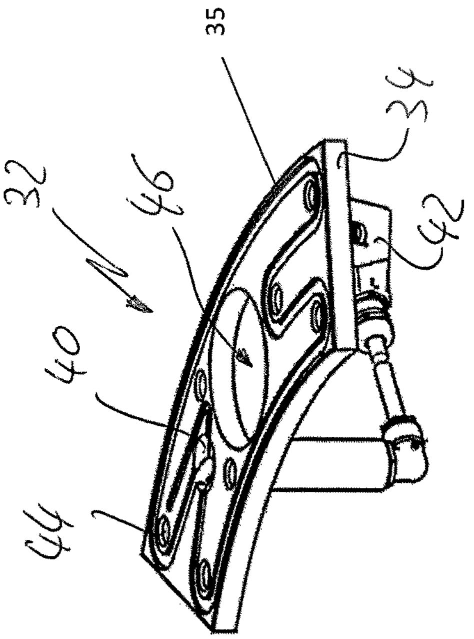

FIG. 5 a perspective view of the heating device of FIG. 4.

The vibrating round dryer shown in FIG. 1 has a generally circular cylindrical container 10 that is resiliently supported on a base frame not shown in the Figures. The container 10 can be set into vibration by an oscillation unit, for example an electric motor having an eccentric member, arranged in an inner space 12 of the container 1 such that the total container vibrates or oscillates with respect to the base frame.

A generally annular working passage 14 is provided in the interior of the container and has a planar section 16 and a helically rising section 18 in the embodiment shown. However, the working passage could also be planar as a whole. Drying agent and workpieces can be introduced into the start of the planar section 16 of the working passage 18 via a laterally attached feed. Due to the vibration of the container 10, drying agent and workpieces then move clockwise in the direction of the helically rising section 18 and are conveyed up to the end of this helical section 18. At the end of this section 18, drying agent and/or workpieces fall back down over a step 22 onto the planar section 16 of the working passage. Alternatively, the workpieces can be discharged again through an outlet 24 by inserting a discharge screen, a magnet, a linear vibrator or the like. The reference numeral 26 designates an opening into which a screen can be inserted.

As FIG. 3 illustrates, in the embodiment example shown, the working passage 14 is trapezoidal in cross-section in its lower region. In this respect, the base plate 28 is planar in the planar section 16 of the working passage. In contrast, the base plate is curved in the helically rising section 18 of the working passage. However, the working passage could also be round, oval, or rectangular in cross-section, or helically rising as a whole.

As FIG. 2 and FIG. 3 further illustrate, a heating device 32 is thermally conductively installed at the lower side of the container 10, as shown in more detail in FIG. 4 and FIG. 5. In the illustrated embodiment example, only one heating device 32 is shown. However, a plurality of heating devices 32 can also be installed, in particular at the lower side of the planar base plate 28 of the working passage 14.

The heating device 32 is configured as a module and, in the embodiment example shown, has a thermally conductive block 34 which is curved in plan view, which is composed of material with good thermal conductivity, for example aluminum, and in which a serpentine heating rod 36 is embedded. For this purpose, a groove 35 is worked into or a channel is milled into the thermally conductive block 34, into which groove 35 or channel the heating rod 36 is inserted. To improve the heat transfer, the groove 35 can additionally be filled with a thermally conductive paste. The thermally conductive surface of the thermally conductive block can also be provided with an agent that increases the thermal conductance, for example with a thermally conductive paste, a copper foil, a fleece or the like.

The heat transfer from the heating device to the container therefore takes place by means of thermal conductance, i.e. by a heat transfer between solid bodies, namely from the thermally conductive block 34 to the base plate of the working passage, and not by radiation or convection, which makes a high degree of efficiency possible.

A temperature sensor 38 is embedded in a further groove of the thermally conductive block 34, wherein the supply line of the temperature sensor 38 and the two ends of the heating rod 36 are led out of the thermally conductive block 34 by means of a leadthrough 40. An electrical connection plug 42 serves for an electrical connection of the heating rod 36 and the temperature sensor 38.

As FIG. 4 further illustrates, a plurality of installation bores 44 are provided in the thermally conductive block 34 and make it possible to thermally conductively fasten the thermally conductive block or the heating module to the lower side of the base 28 of the working passage 14 over a large area with good thermal contact by means of stud bolts, for example. Furthermore, the thermally conductive block 34 has a circular recess 46 passing through it. This recess 46 enables the installation of the heating device 32 such that a bearing part of the container 10 for receiving the bearing springs (not shown) can be arranged in the region of the recess.

FIG. 4 illustrates that the heating rod 36 is arranged in a serpentine manner within the thermally conductive block 34, taking into account the installation bores 44 and the recess 46, in order to achieve a large-area and optimized heat transfer. Furthermore, the thermally conductive block has a comparatively large surface area of at least 150 $cm^2$, in particular of at least 300 $cm^2$, and in particular of at least 500 $cm^2$, via which the heating device 32 is thermally conductively connected to the container 10.

For an optimized process control, at least one temperature sensor 50 (FIG. 2) can be provided in the working passage to monitor the actual temperature in the drying medium. Furthermore, a control can be provided that controls and monitors a plurality of the heating modules shown in FIG. 4 and FIG. 5 independently of one another.

The invention claimed is:

1. A vibrating round dryer, comprising a container that is resiliently supported on a base frame and that can be set into vibration by an oscillation unit;

a working passage provided in the container; and a heating device for heating drying agent and workpieces that are located in the working passage, wherein the heating device is thermally conductively installed at the container and has at least one thermally conductive block in which at least one serpentine heating rod is embedded, and wherein a temperature sensor is embedded in the thermally conductive block, wherein the at least one serpentine heating rod includes two ends, wherein each of the two ends are led out of the thermally conductive block through a leadthrough.

2. The vibrating round dryer in accordance with claim 1, wherein the heating device is installed at the lower side of a planar base plate of the working passage.

3. The vibrating round dryer in accordance with claim 1, wherein the working passage has a planar section and a helically rising section, and wherein the heating device is only provided in the region of the planar section.

4. The vibrating round dryer in accordance with claim 1, wherein the thermally conductive block has a recess which passes through it and in which a bearing part of the container is arranged.

5. The vibrating round dryer in accordance with claim 1, wherein the heating device is thermally conductively connected to the container over an area of at least 150 $cm^2$.

6. The vibrating round dryer in accordance with claim 1, wherein the heating device is thermally conductively connected to the container over an area of at least 300 $cm^2$.

7. The vibrating round dryer in accordance with claim 1, wherein the heating device is thermally conductively connected to the container over an area of at least 500 $cm^2$.

8. The vibrating round dryer in accordance with claim 1, wherein at least one further temperature sensor is provided in the working passage.

9. The vibrating round dryer in accordance with claim 1, wherein the heating device comprises a plurality of heating modules that are controlled and monitored independently of one another.

10. The vibrating round dryer in accordance with claim 1, wherein the heating device comprises a plurality of heating modules that are controlled and monitored independently of one another by a control.

11. The vibrating round dryer in accordance with claim 1, wherein the container is provided with a thermal insulation in the region of the working passage.

12. The vibrating round dryer in accordance with claim 1, wherein the working passage is provided with a cover at its upper side.

13. The vibrating round dryer in accordance with claim 1, wherein the container is at least partly provided with a thermal insulating wear protection layer in the region of the working passage.

14. The vibrating round dryer in accordance with claim 13, wherein the thermal insulating wear protection layer comprises a coating composed of one of a ceramic material and polytetrafluoroethylene.

15. A vibrating round dryer, comprising:

a container that is resiliently supported on a base frame and that can be set into vibration by an oscillation unit;

a working passage provided in the container; and a heating device for heating drying agent and workpieces that are located in the working passage, wherein the heating device is thermally conductively installed at the container and has at least one thermally conductive block in which at least one serpentine heating rod is embedded, and wherein a temperature sensor is embedded in the thermally conductive block, wherein the thermally conductive block is an aluminum block, wherein the at least one serpentine heating rod includes two ends, wherein each of the two ends are led out of the thermally conductive block through a leadthrough.

16. A vibrating round dryer, comprising:

a container that is resiliently supported on a base frame and that can be set into vibration by an oscillation unit;

a working passage provided in the container; and a heating device for heating drying agent and workpieces that are located in the working passage, wherein the heating device is thermally conductively installed at the container and has at least one thermally conductive block in which at least one serpentine heating rod is embedded, and wherein a temperature sensor is embedded in the thermally conductive block, wherein the heating rod is inserted in a serpentine groove that is worked into the thermally conductive block, and the thermally conductive block is mounted to the container with the serpentine groove facing a lower side of the working passage, wherein the at least one serpentine heating rod includes two ends, wherein each of the two ends are led out of the thermally conductive block through a leadthrough.

17. A vibrating round dryer, comprising a container that is resiliently supported on a base frame and that can be set into vibration by an oscillation unit;

a working passage provided in the container; and a heating device for heating drying agent and workpieces that are located in the working passage, wherein the heating device is thermally conductively installed at the container and has at least one thermally conductive block in which at least one serpentine heating rod is embedded, and wherein a temperature sensor is embedded in the thermally conductive block, wherein the thermally conductive block is a curved segment having a first end and a second end which are non-coincident with each other, wherein the at least one serpentine heating rod includes two ends, wherein each of the two ends are led out of the thermally conductive block through a leadthrough.

* * * * *